United States Patent
Heiligman

Patent Number: 5,393,548
Date of Patent: Feb. 28, 1995

[54] METHOD OF MAKING COFFEE USING WATER FILTRATION DEVICE

[75] Inventor: Randy B. Heiligman, Minnetonka, Minn.

[73] Assignee: UltraPure Systems, Inc., Minneapolis, Minn.

[21] Appl. No.: 164,365

[22] Filed: Dec. 9, 1993

Related U.S. Application Data

[63] Continuation-in-part of Ser. No. 67,120, May 26, 1993, Pat. No. 5,318,703, and a continuation-in-part of Ser. No. 107,643, Aug. 17, 1993.

[51] Int. Cl.[6] ............................................. A23F 5/00
[52] U.S. Cl. ..................................... 426/433; 426/422; 426/432; 210/264; 210/266; 210/282; 210/283; 210/497.3
[58] Field of Search ................ 426/66, 422, 432, 433, 426/435; 210/263, 264, 266, 282, 283, 473, 474, 477, 482, 488, 489, 495, 497.01, 499, 497.3

[56] References Cited

U.S. PATENT DOCUMENTS

| | | | |
|---|---|---|---|
| 3,304,852 | 2/1967 | Lande | 99/319 |
| 3,389,650 | 6/1968 | Michielsen | 426/433 X |
| 3,420,675 | 1/1969 | Costas | 99/77.1 |
| 3,971,305 | 7/1976 | Daswick | 99/295 |
| 4,080,299 | 3/1978 | Bartolome | 210/479 |
| 4,528,095 | 7/1985 | Byrne | 210/206 |
| 4,764,274 | 8/1988 | Miller | 210/232 |
| 4,826,594 | 5/1989 | Sedman | 210/264 |
| 4,826,695 | 5/1989 | Tanner | 426/77 |
| 4,859,348 | 8/1989 | Jusaitis et al. | 210/799 |
| 4,867,875 | 9/1989 | Peranio | 210/186 |
| 4,867,880 | 9/1989 | Pelle et al. | 210/474 |
| 4,963,262 | 10/1990 | Johnstone | 210/474 |
| 4,995,975 | 2/1991 | Jacquot et al. | 210/264 |
| 4,999,109 | 3/1991 | Sabre | 210/264 |
| 5,076,912 | 12/1991 | Belz et al. | 210/264 |

*Primary Examiner*—Donald E. Czaja
*Assistant Examiner*—Milton I. Cano
*Attorney, Agent, or Firm*—Kinney & Lange

[57] ABSTRACT

A method of making coffee from ground coffee beans and water includes providing an automatic drop coffee maker including a heater mechanism for heating the water wherein the heater means has a hot water drip outlet, a basket for holding the ground coffee beans wherein the basket has an inlet and an outlet and is positioned below the hot water drip outlet such that the hot water drips into the basket and mixes with the ground coffee beans, and a collection vessel for collecting hot water after it mixes with the ground coffee beans. The method further includes providing a water filtration device for filtering impurities from the water; positioning the water filtration device between the hot water drip outlet and the ground coffee beans; heating the water using the heater mechanism; and passing the heated water through the water filtration device and the ground coffee beans and into the collection vessel.

22 Claims, 4 Drawing Sheets

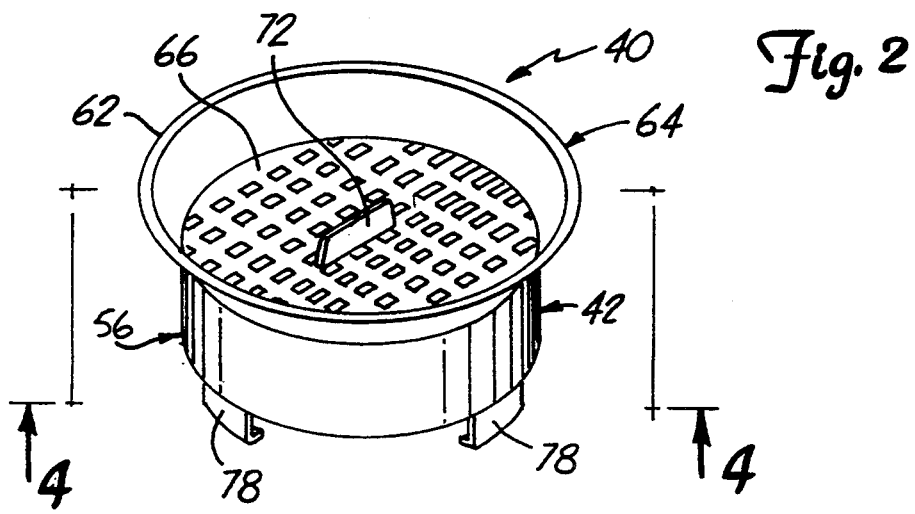
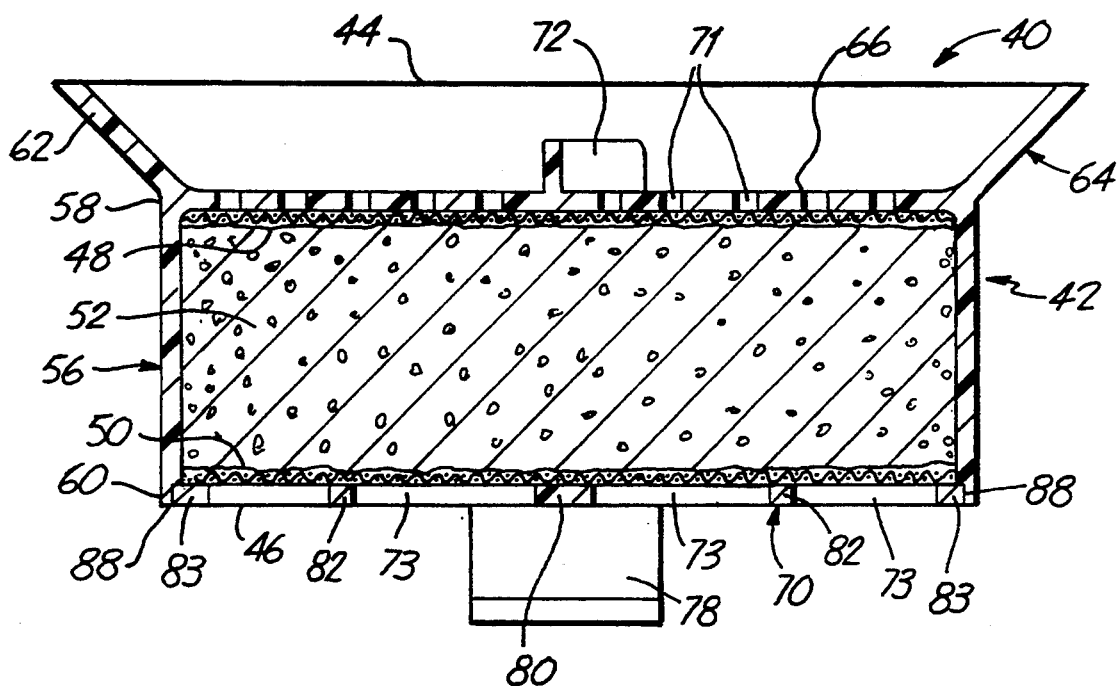

METHOD OF MAKING COFFEE USING WATER FILTRATION DEVICE

CROSS-REFERENCE TO CO-PENDING APPLICATIONS

This is a continuation-in-part application of Ser. No. 08/067,120, filed May 26, 1993 now U.S. Pat. No. 5,318,703, and 08/107,643, filed Aug. 17, 1993.

BACKGROUND OF THE INVENTION

The present invention relates to water filtration devices used in filtering impurities from water, and more particularly, a method of making coffee from ground coffee beans and water using a water filtration device.

There are many known methods for making coffee from coffee beans and water. One of the more popular methods involves the use of an automatic drip coffee maker which includes a water chamber into which a predetermined amount of water is filled, a basket for holding the ground coffee beans, and a coffee pot for collecting and storing the brewed coffee. The water is passed through a series of heating coils in the automatic drip coffee maker to raise the temperature of the water to near boiling. A hot water drip outlet is positioned above the coffee grounds in the basket so that the hot water drips onto and mixes with the ground coffee beans to make the brewed coffee. A coffee filter is typically inserted between the ground coffee beans and the basket to prevent the coffee grounds from passing into the coffee.

The taste and flavor of the coffee is greatly affected by the quality of the water used to make it. Tap water in most municipalities is typically treated with chlorine and other chemicals to disinfect the water supply. However, the chlorine reacts adversely with the water, leaving a distinct "chlorine" taste and odor. When chlorine-treated tap water is used to make coffee, the chlorine in the water reacts with the ground coffee beans, thereby affecting the taste and flavor of the resultant coffee.

Water filtration devices typically include a layer of carbon granules or other suitable filtering media. When making coffee in the past, water filtration devices have been placed on top of the water chamber of the automatic drip coffee maker and held in place while the water was poured through the filter. This method is inconvenient and inefficient for several reasons. First, it requires the awkward step of having to manually hold the water filtration device in place while the water is poured through it. Additionally, the slower the rate of flow of the water through the water filtration device, the more efficient the filtration. Therefore, the water has to be poured slowly which was an inconvenience to the person making the coffee. If the water was poured quickly through the water filtration device then impurities are often left in the water, thereby affecting the coffee flavor. Water filtration devices mounted at a water faucet improve the taste and flavor of the coffee, but such devices are often costly and difficult to install.

SUMMARY OF THE INVENTION

The present invention relates to a method of making coffee from ground coffee beans and water comprising providing an automatic drip coffee maker including a heater means for heating the water wherein the heater means has a hot water drip outlet, a basket for holding the ground coffee beans wherein the basket has an inlet and an outlet and is positioned below the hot water drip outlet such that the hot water drips into the basket and mixes with the ground coffee beans, and a collection vessel for collecting the hot water after it mixes with the ground coffee beans. The method further includes providing a water filtration device for filtering impurities from the water; positioning the water filtration device between the hot water drip outlet and the ground coffee beans; heating the water using the heater means; and passing the heated water through the water filtration device and the ground coffee beans and into the collection vessel.

In one embodiment, the water filtration device includes a housing, a first mesh screen positioned within the housing, a second mesh screen positioned within the housing, and activated carbon positioned between the first and second mesh screens. The water filtration device also includes support means for supporting the water filtration device above the ground coffee beans so that the ground coffee beans do not back up into and enter the water filtration device. The support means may include, for example, a plurality of feet protruding from the bottom of the water filtration device for supporting the water filtration device on the ground coffee beans, or clamp means suspending the water filtration device across the hot water drip outlet of the automatic drip coffee maker.

BRIEF DESCRIPTION OF THE DRAWINGS

FIG. 2 is a perspective view of the water filtration device according to the present invention.

FIG. 4 is a cross-sectional view across line 4—4 of FIG. 2.

DETAILED DESCRIPTION OF THE PREFERRED EMBODIMENTS

Figure 1:
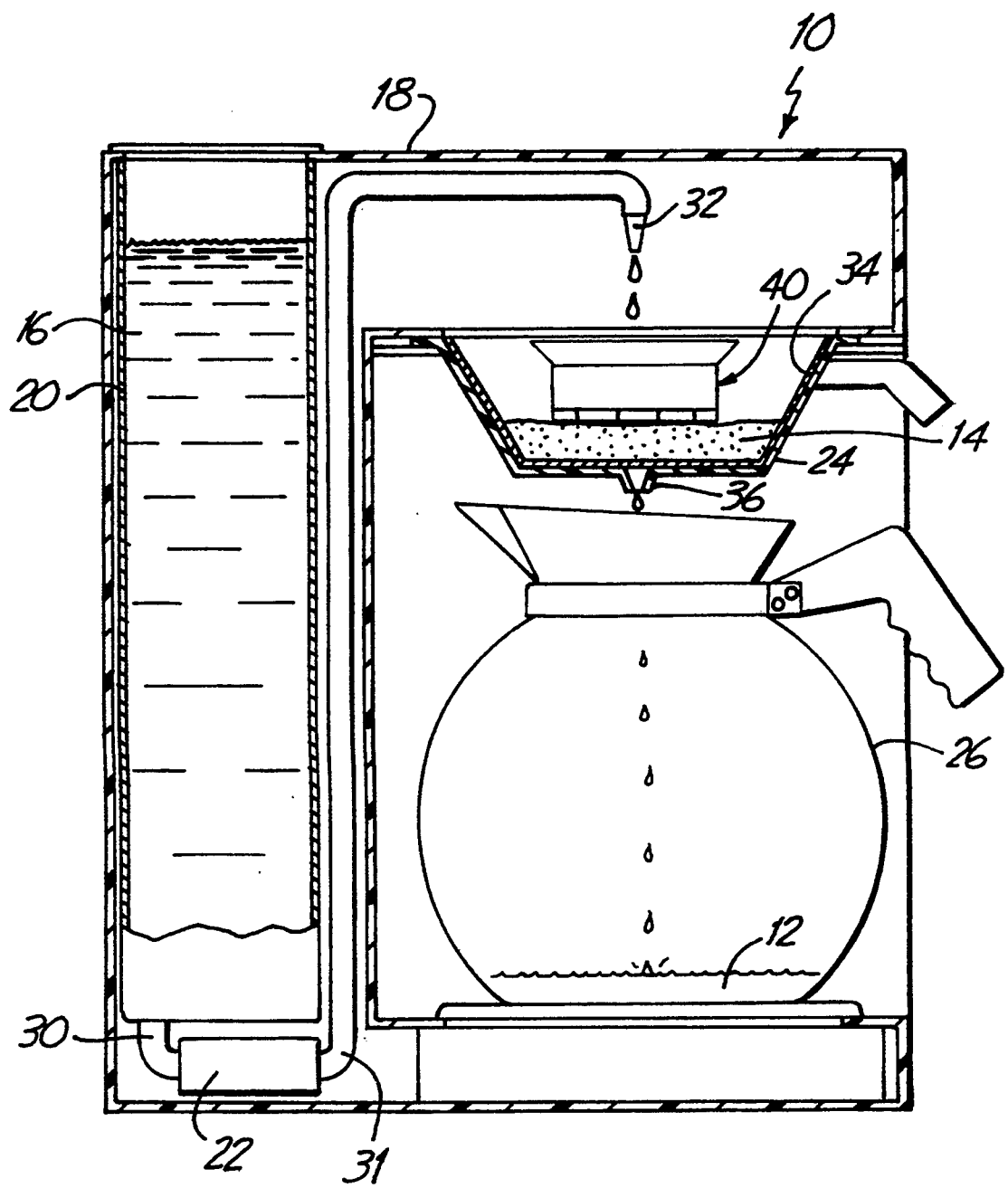
FIG. 1 is a perspective view of an automatic drip coffee maker employing the present invention.

FIG. 1 illustrates an automatic drip coffee maker 10 used in making coffee 12 from ground coffee beans 14 and water 16. The automatic drip coffee maker 10 is a conventional consumer product which is available in any department store and all of the components therein are well known to those skilled in the art. The automatic drip coffee maker 10 includes a housing 18, a cold water storage chamber 20, a heating device 22, a round basket 24 having a diameter of approximately 4 to 5 inches, and a collection vessel 26. Tap water 16 is poured into the water storage chamber 20, passed through an outlet 30 thereof into the heating device 22 where the water 16 is then heated until it is almost boiling. The heating device 22 has an outlet 31 terminating in a hot water drip outlet 32 which is positioned above the basket 24 such that the hot water 16 drips or flows onto the coffee grounds 14 contained in the basket 24. As the hot water 16 mixes with the ground coffee beans 14 in the basket 24, the taste and flavor of the ground coffee beans 14 passes into the hot water 16 such that the coffee 12 is formed. The coffee 12 passes through a coffee filter 34 positioned between the ground coffee beans 14 and the basket 24 and out an outlet 36 in the underside of the basket 24 into the collection vessel 26, where it may then be transported and poured into drinking cups.

According to the present invention, there is provided a water filtration device 40 positioned between the hot water drip outlet 32 and the ground coffee beans 14 for filtering impurities such as particulater matter, chemicals such as chlorine, bacteria, and unpleasant odor and taste from the hot water 16. The present invention provides a method for filtering the water 16 which is convenient to use, since it does not require manually holding a filter while the water is poured through it, as mentioned above, and since the water filtration device 40 provides a method for filtering the water 16 which is hidden within the automatic drip coffee maker 10. The present invention also improves the consistency of the taste of the coffee 12 since the hot water 16 (as opposed to cold water) is being filtered, and since the flow rate of the hot water through the filter is automatically controlled within the automatic dip coffee maker 10, thereby assuring proper filtration of the impurities from the water.

Figure 3:
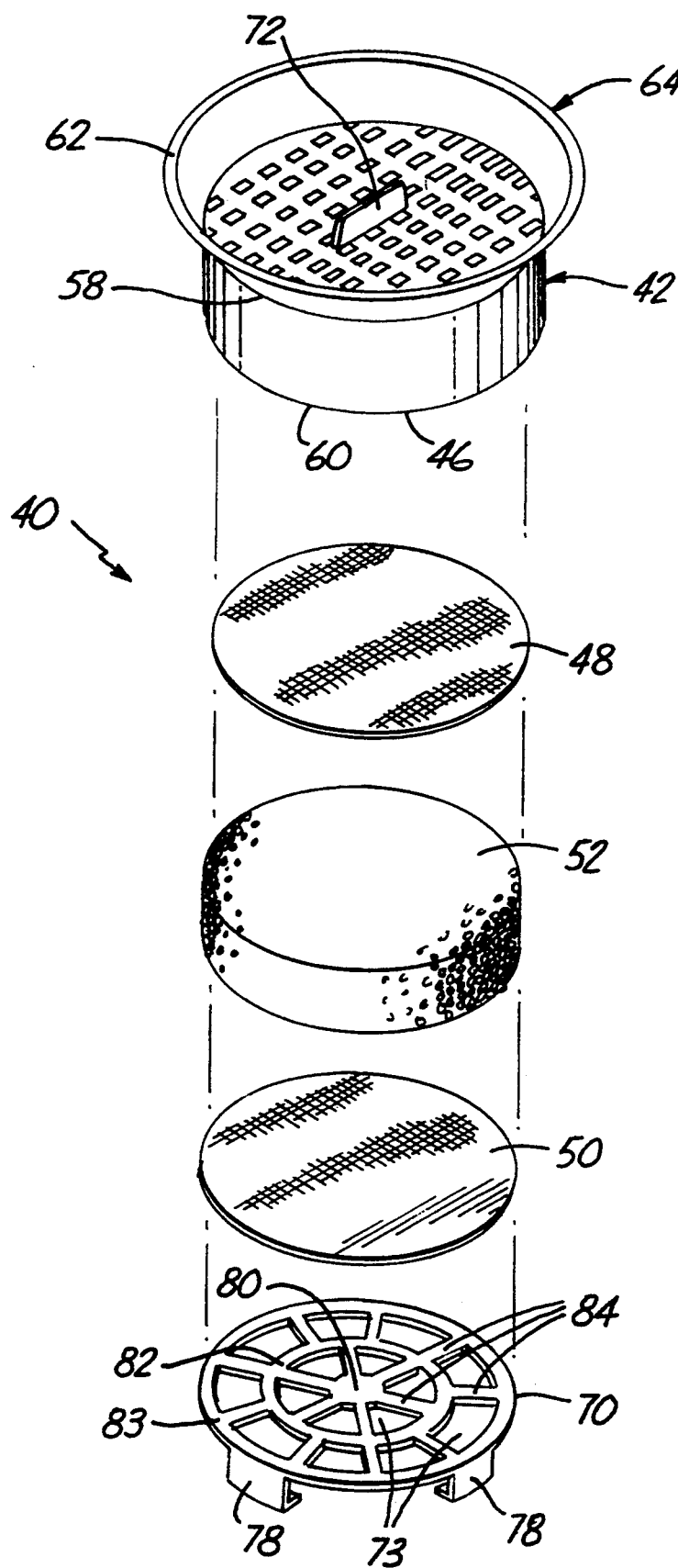
FIG. 3 is an exploded perspective view of the water filtration device shown in FIG. 2.

As shown in FIGS. 2–4, the water filtration device 40 includes a cylindrical filter housing 42 open at a top end 44 for receiving the hot water 16 and open at a bottom end 46 for passing the filtered water, a first mesh screen 48 positioned across the top end 44 of the filter housing 42, a second mesh screen 50 positioned across the open bottom end 46 of the filter housing 42, a filter media 52 positioned between the first and second mesh screens 48 and 50, and a second planar horizontal mesh member 70 positioned below the second mesh screen 50 for engaging the filter housing 42 adjacent to the lower edge 60 to close the filter housing 42 with the first mesh screen 48, the filter media 52, and the second mesh screen 50 contained therein.

The filter housing 42 defines a chamber 56 having an upper edge 58 and a lower edge 60, a flared annular lip 62 extending upwardly and outwardly from the upper edge 58 to define a funnel 64 above the chamber 56 for receiving the hot water 16 passing through the hot water drip outlet 32, and a first planar horizontal mesh member 66 extending across the upper edge 58 to separate the funnel 64 from the chamber 56. The chamber 56 has a diameter of approximately 3 inches, however the diameter of the chamber 56 may be varied so long as the chamber 56 is sufficiently small enough to fit entirely within the basket 24 when the basket 24 is enclosed within the automatic drip coffee maker 10. The diameter of the filter housing 42 at the flared annular lip 62 is approximately 3.5 to 4 inches and the annular lip 62 makes an angle of approximately 45° with the first planar horizontal mesh member 66. Again, the size of the annular lip and the angle may be varied so long as the filter housing 42 fits entirely within the basket when the basket is enclosed within the automatic drip coffee maker 10. The filter housing 42 is preferably constructed of an injection molded polymer. However, it may also be constructed of metal, paper, cardboard, mesh material or other suitable material.

The first planar horizontal mesh member 66 includes a plurality of holes 71 formed thereon allowing the filtered hot water 16 to flow onto the ground coffee beans 14 in the basket 24, and a handle 72 for placing the water filtration device 40 in the basket 24 and for removing the water filtration device 40 from the basket 24. The handle 72 is preferably molded to the center of the first planar horizontal mesh member 66 such that it extends upward therefrom into the funnel 64 where it is easily accessible.

The second planar horizontal mesh member 70 includes a plurality of support feet 78 extending downward from the second planar horizontal mesh member 70 for engaging the ground coffee beans 14 and for supporting the filter housing 42 above the ground coffee beans 14 such that the ground coffee beans 14 do not back up into the water filtration device 40. As shown in the preferred embodiment, three equidistantly spaced feet 78 support the water filtration device 40 on the ground coffee beans 14. A plurality of voids 73 on the second planar horizontal mesh member 70 are formed by a round center member 80, ring members 82 and 83 concentric to the round center 80, and a plurality of spoke members 84 connecting the center member 80 to the ring members 82 and 83. The plurality of voids 73 are formed between the intersecting center member 80, the ring members 82 and 83, and the spoke members 84. The positioning of the center member 80, the ring members 82 and 83, and the spoke members 84 may be varied. For example, they may be positioned between the filter media 52 and the second mesh screen 50, or the center member 80, ring member 82, and the spoke members 84 may be so positioned, or the spoke members 84 only may be so positioned. The second planar horizontal mesh member 70 is preferably constructed of an injection molded polymer. However, it may also be constructed of metal, paper, cardboard, mesh material or other suitable material.

The filter media 52 is encapsulated and confined within the cylindrical filter housing 42 between the first planar horizontal mesh member 66 and the first mesh screen 48 on one side and the second planar horizontal mesh member 70 and second mesh screen 50 on the opposite side. As shown in FIGS. 3 and 4, the filter media 52 is preferably loose carbon granules having a granular size in the range of approximately $5 \times 100$ mesh size. The carbon granules and available, for example, by Westvaco. Other materials such as KDF resin, as explained below, may be used as the filtering media 52 for the removal of chlorine for improved taste or for filtering out magnesium permeate for removing water "hardness". Different filter media 52 may be used independently depending upon filtration requirements, or may be mixed or blended with other appropriate media to provide for the treatment of multiple substances, such as unwanted taste, odor, dirt, sediment, scale lime or hardness, from the water 16. Examples of different filter media 52 include activated charcoal, KDF resin and magnesium permeate.

The first and second mesh screens 48 and 50 are preferably a nylon web configuration so as to permit the water 16 to flow into and out of the filter media 52 and yet so as to retain the loose carbon granules or other filter media 52 within the filter housing 42. However, it is to be understood that the first and second mesh screens may be any water permeable filtration media which contains the filter media 52 therebetween, such as plastic, metal, cardboard, paper, fibrous material or the like which includes holes, slots or the like for the passage of water. The first and second mesh screening 48 and 50, in addition to retaining the filter media 52 within the filter housing 42, also serve to provide additional filtration of impurities such as particulate matter. The first and second mesh screens 48 and 50 have a diameter of approximately 3 inches, however the diameter must be slightly less the diameter of the chamber 56 so that the mesh screens can be positioned within the chamber 56.

The water filtration device 40 is assembled by affixing the first mesh screen 48 within the chamber 56 and to the underside of the first horizontal planar mesh member 66, such as by ultrasonic welding or other suitable means. The filter media 52 is then placed in the chamber 56 against the first mesh screen 48. Next, the second mesh screen 50 is secured to the second planar horizontal mesh member 70, such as by ultrasonic welding, and the second planar horizontal mesh member 70 is then positioned in an annular groove 88 at the lower edge 60 of the filter housing 42 such that the second mesh screen 50 is positioned adjacent to the filter media 52. The second planar horizontal mesh member 70 is secured within the annular groove 88 to the filter housing 42 by ultrasonic welding, adhesives or other suitable securing means. In an alternative embodiment, the second planar horizontal mesh member 70 can be molded integral to the chamber 56 and the first planar horizontal mesh member 66 can be dropped in and secured to the chamber 56 once the first and second mesh screens 48 and 50 and filter media 52 are inserted into the cylindrical filter housing 42.

To make coffee 12 using the automatic drip coffee maker 10, the ground coffee beans 14 are first placed within the basket 24 which contains the coffee filter 34. The water filtration device 40 is then gripped using the handle 72 and inserted into the basket 24 such that the support feet 78 rest on the ground coffee beans 14. The basket 24 is then inserted into the automatic drip coffee maker 10 such that the water filtration device 40 is positioned between the hot water drip outlet 32 of the automatic drip coffee maker 10 and the ground coffee beans 14 to filter the hot water 16. Approximately 95% of the chlorine is removed by using the coffee filtration device 40 according to the present invention.

Water 16 introduced into the cold water storage chamber 20 of the automatic drip coffee maker 10 passes through the heater device 22 where it is heated, and is then released from the hot water drip outlet 32. The hot water 16 then collects in the funnel 64 of the water filtration device 40 and is retained therein so that there is no spill over, thereby ensuring that all of the hot water is filtered. The hot water 16 then passes through the plurality of holes 71 in the first planar horizontal mesh member 66 and through the first mesh screen 48 which filters out large granular impurities or other undesirable material such as sediment or dirt particles. After the coarse filtering provided by the first mesh screen 48, the water 16 is filtered through the loose carbon granules of the filter media 52 which removes the bacteria, chlorine, and other impurities and then through the second mesh screen 50. The filtered hot water 16 then passes through the plurality of voids 73 in the second planar horizontal mesh member 70 and then passes onto and mixes with the mound of ground coffee beans 14 in the basket 24. The hot water, or now coffee, passes through the coffee filter 34 and then through outlet 36 in the underside of the basket 24 and into the collection vessel 26.

Figure 5:
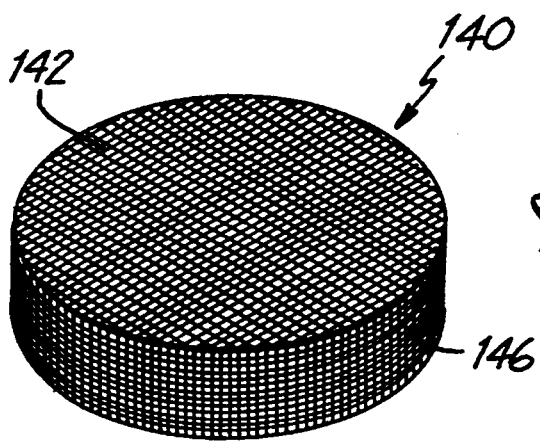
FIG. 5 is a perspective view of another embodiment of a water filtration device.
Figure 6:
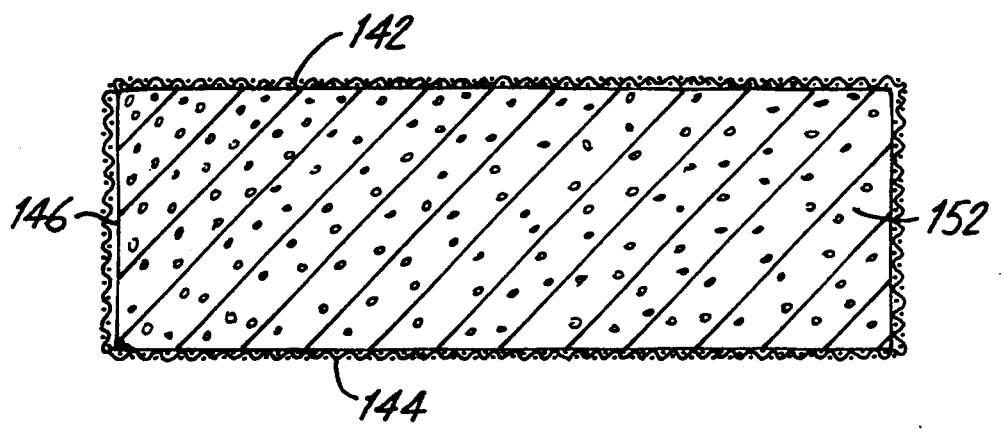
FIG. 6 is a cross-sectional view along line 6—6 of FIG. 5.

Referring to FIGS. 5 and 6, there is shown an alternative embodiment of a water filtration device 140 wherein a filter media 152 contained therein may be activated charcoal, KDF resin, magnesium permeate, or other suitable filtration media. The water filtration device 140 is placed upon the ground coffee beans 14 in the automatic drip coffee maker 10 or other similar device to filter the incoming water 16 from the hot water drip outlet 32 prior to its contact with the ground coffee beans 14 positioned below it. Alternatively, the water filtration device 140 may be mounted directly over the hot water drip outlet 32 by clamps (not shown), snaps, ties, screws or the like.

The water filtration device 140 includes a top mesh surface 142, a bottom mesh surface 144, and a cylindrical side mesh surface 146 connecting a periphery of the top surface 142 to a periphery of the bottom surface 144. The top, bottom and cylindrical side mesh surfaces 142, 144, and 146 are constructed of wire, plastic or other mesh composition which allows the flow of the hot water 16 to pass through from the top mesh surface 142, through the contained filtration media 152, and then through the bottom mesh surface 144 or even through the cylindrical side mesh surfaces 146. Although the top, bottom and side mesh surfaces 142, 144, and 146 are described as mesh, any suitable permeable surfaces may be used which allow passage of hot water 16 and may include small holes, slots or the like. The top, bottom and side surfaces 142, 144, and 146 may also be of porous material such as plastic, metal, cardboard, paper, fibrous material or the like which includes holes, slots or the like for the passage of water. Additionally, the top, bottom and side surfaces 142, 144, and 148 may form a flexible bag or rigid housing.

Although the present invention has been described with reference to preferred embodiments, workers skilled in the art will recognize that changes may be made in form and detail without departing from the spirit and scope of the invention.

What is claimed is:

1. A method of making coffee from ground coffee beans and water, the method comprising:
providing an automatic drip coffee maker including a heater means for heating the water wherein the heater means has a hot water drip outlet, a basket for holding the ground coffee beans wherein the basket has an inlet and an outlet and is positioned below the hot water drip outlet such that the hot water drips into the basket and mixes with the ground coffee beans, and a collection vessel for collecting the hot water after the hot water mixes with the ground coffee beans;
positioning a water filtration device for filtering impurities from the hot water between the hot water drip outlet and the ground coffee beans such that impurities in the hot water are filtered out of the hot water as the hot water passes through the filtration device;
heating the water using the heater means; and
passing the heated water through the water filtration device and the ground coffee beans and into the collection vessel.

2. The method as in claim 1, wherein the water filtration device is positioned in the basket.

3. The method as in claim 1, wherein the water filtration device utilizes activated carbon.

4. The method as in claim 3, wherein the water filtration device has a top layer and a bottom layer, wherein the top layer and the bottom layer are water permeable filtration media, and wherein the activated carbon is positioned between the top layer and the bottom layer.

5. The method as in claim 3, wherein the water filtration device includes a first mesh screen and a second mesh screen, and wherein the activated carbon is positioned between the first and second mesh screens.

6. The method as in claim 5, wherein the first and second mesh screens are made from a polymer.

7. The method as in claim 1, wherein the water filtration device includes a cylindrical filter housing which defines a chamber and which has an upper edge and a lower edge, and a flared annular lip extending upwardly and outwardly from the upper edge to define a funnel above the chamber.

8. The method as in claim 7, wherein the water filtration device further includes a first mesh member adjacent to the upper edge and a second mesh member adjacent to the lower edge.

9. The method as in claim 8, wherein the water filtration device further includes a lower horizontal planar member attached to the lower edge for securing the second mesh screen within the chamber.

10. The method as in claim 9, wherein the lower horizontal chamber member includes spoke means.

11. The method as in claim 7, wherein the water filtration device further includes a plurality of support feet extending downward from the filtration device, and wherein the method further comprises positioning the support feet upon the ground coffee to support the filtering device above the ground coffee.

12. The method as in claim 7, wherein the cylindrical filter housing further includes an upper horizontal mesh member extending across the upper edge to separate the funnel from the chamber.

13. The method as in claim 7, wherein the water filtration device further comprises a gripping handle positioned on the horizontal mesh member.

14. A method of making coffee from ground coffee beans and water using an automatic drip coffee maker, the automatic drip coffee maker having heater means for heating the water and a hot water drip outlet for passing the heated water, a mixing vessel for housing the ground coffee beans therein, the mixing vessel having an inlet positioned below the hot water drip outlet such that the heated water drips onto the ground coffee beans and an outlet for passing the coffee, the method comprising:

positioning a water filtration device for filtering impurities from the heated water between the hot water drip outlet and the ground coffee;

heating the water using the heater means to produce the heated water; and passing the heated water through the hot water drip outlet, through the filtration device, and into the mixing vessel where the hot water mixes with the ground coffee.

15. The method as in claim 14, wherein the water filtration device is positioned in the basket.

16. The method as in claim 14, wherein the water filtration device utilizes activated carbon.

17. The method as in claim 16, wherein the water filtering device includes a first mesh screen and a second mesh screen, and wherein the activated carbon is positioned between the first and second mesh screens.

18. The method as in claim 14, wherein the water filtration device has a top layer and a bottom layer, wherein the top layer and the bottom layer are water permeable filtration media, and wherein the activated carbon is positioned between the top layer and the bottom layer.

19. The method as in claim 14, wherein the water filtration device includes a cylindrical filter housing which defines a chamber and which has an upper edge and a lower edge, and a flared annular lip extending upwardly and outwardly from the upper edge to define a funnel above the chamber.

20. The method as in claim 19, wherein the water filtration device further includes a first mesh member adjacent to the upper edge and a second mesh member adjacent to the lower edge.

21. The method as in claim 20, wherein the water filtration device further includes a lower horizontal planar member attached to the lower edge for securing the second mesh screen within the chamber.

22. The method as in claim 14, wherein the water filtration device further includes a plurality of support feet extending downward from the filtration device, and wherein the method further comprises positioning the support feet upon the ground coffee to support the filtering device above the ground coffee.

* * * * *